United States Patent [19]

Squier

[11] Patent Number: 4,548,275

[45] Date of Patent: Oct. 22, 1985

[54] DEVICE FOR SEPARATING CLODS AND STONE FROM THE SOIL

[75] Inventor: William H. R. Squier, Rochford, England

[73] Assignee: A W Squier Limited, Essex, England

[21] Appl. No.: 486,545

[22] Filed: Apr. 19, 1983

[30] Foreign Application Priority Data

Apr. 19, 1982 [GB] United Kingdom ................ 8211307

[51] Int. Cl.[4] .............................................. A01B 43/00
[52] U.S. Cl. ....................................... 171/14; 171/63; 171/126; 241/200
[58] Field of Search ..................................... 171/13–14, 171/63, 112, 114, 126, 120, 25, 10, 27; 172/33, 32, 67; 56/327 R; 130/22 R; 241/200

[56] References Cited

U.S. PATENT DOCUMENTS

| | | | |
|---|---|---|---|
| 3,198,259 | 8/1965 | Manuel | 171/25 X |
| 3,810,512 | 5/1974 | Porter | 171/14 |
| 3,981,365 | 9/1976 | Arnold et al. | 171/63 |
| 4,262,477 | 4/1981 | Turold et al. | 56/327 R |
| 4,426,832 | 1/1984 | Porter | 56/327 R |

FOREIGN PATENT DOCUMENTS

| | | | |
|---|---|---|---|
| 1238648 | 7/1960 | France | 171/25 |
| 1524391 | 9/1978 | United Kingdom | 171/63 |
| 572235 | 5/1975 | U.S.S.R. | 172/33 |

*Primary Examiner*—Richard T. Stouffer
*Attorney, Agent, or Firm*—Wenderoth, Lind & Ponack

[57] ABSTRACT

A device for separating clods and stones from the soil includes a frame adapted to be drawn or carried across the land and one or more elements carried by the frame for raising the surface layer of material from the land and passing it to a first conveyor having apertures therethrough to permit material on the conveyor to pass through the conveyor and to be returned to the land, there being disposed above the conveyor a surface adapted to bear against material on the conveyor so as to crush and/or abrade material on the conveyor and thereby reduce its particle size to permit it to pass through the apertures. The first conveyor is adapted to discharge particles of material retained thereon to a device for returning those particles to the land on either or both sides of the device. The surface and/or the first conveyor are adapted to move apart from one another to permit the passage therebetween of resistent material.

8 Claims, 2 Drawing Figures

DEVICE FOR SEPARATING CLODS AND STONE FROM THE SOIL

BACKGROUND OF THE INVENTION

The present invention relates to a device for breaking up aggregates of soil or clods as they will hereinafter be denoted.

During the harvesting of potatoes, mechanical devices are used to lift the potatoes out of the ground. With some machines (diggers) the potatoes are merely lifted and then deposited on the ground for manual collection. In others (harvesters) the lifted potatoes are screened and collected. For convenience the term potato harvester will be used herein to denote both forms of machine. Many clods of earth and stones are picked up by the harvester and these can cause damage to the potatoes and must be removed from the harvested crop before it is packed for sale. This requires costly labour and there have been many proposals for removing stones from the soil at or before sowing of the seed potatoes. However, in general the devices of these earlier proposals have been cumbersome and this has meant that the machines have had to be manoeuvred extensively in the headland of the field in order to turn them around for each succeeding run across the field. This causes compaction and damage to the soil structure and the headland is usually rendered unfit for growing potatoes thus losing part of the potential crop from that field. The search for a simple, effective and easily manoeuvred device continues.

SUMMARY OF THE INVENTION

The present invention provides a simple device for displacing stones from the seed area and for breaking up clods of earth. The device of the invention can be constructed so that it can be carried by a tractor rather than having to be carried by its own ground wheels. This results in a machine which can be readily manoeuvred at the headland of a field with little or no damage to the soil structure in the headland. Due to its compact size, it is possible to treat all but a narrow headland of the total area of the field, thus ensuring that the maximum area of the field is used for raising the crop.

Accordingly, the present invention provides a device which comprises a frame adapted to be drawn or carried across the land; one or more means carried by the frame for raising the surface layer of soil material from the land and passing it to a first conveyor having apertures therethrough to permit material on the conveyor to pass through the conveyor and to be returned to the land, there being disposed above the conveyor a surface adapted to bear against material on the conveyor so as to crush and/or abrade material on the conveyor and thereby reduce its particle size to permit it to pass through the apertures, the first conveyor being adapted to discharge particles of material retained thereon to a means for returning those particles to the land on either or both sides of the device; the surface and/or the first conveyor being adapted to move apart from one another to permit the passage therebetween or resistent material.

Preferably, the surface co-operating with the first conveyor is provided by an elongated flexible member suspended at each end above the first conveyor; and preferably the first conveyor discharges particles onto a second conveyor from which they are displaced to a means for discharging them onto the soil.

Preferably, the device of the invention comprises a conventional potato harvester which has been modified by the provision of a surface co-operating with the first conveyor thereof and by the provision of a displacement means co-operating with the second conveyor thereof.

By forming the first conveyor as an apertured member and by aiding crushing or crumbling of clods of soil on this first conveyor, the finer particles of the soil are not retained on the conveyor but are returned to the land early in their passage through the device. They thus do not present a load which has to be carried by the device as hitherto. In order to aid the tumbling and crumbling which occurs on the first conveyor, this is preferably inclined. This results in a smaller more compact machine than hitherto which can be carried by a tractor, eg. on the three point linkage, as a wholly tractor mounted machine thus aiding manoeuvreability of the machine. Preferably, the particle displacement for the second conveyor means is a substantially static means, eg. a scraper blade, and this simplifies construction of the device of the invention.

BRIEF DESCRIPTION OF THE DRAWINGS

To aid understanding of the invention, it will be described with reference to a preferred form thereof shown in the accompanying drawings, in which.

DETAILED DESCRIPTION OF THE INVENTION

Figure 1:
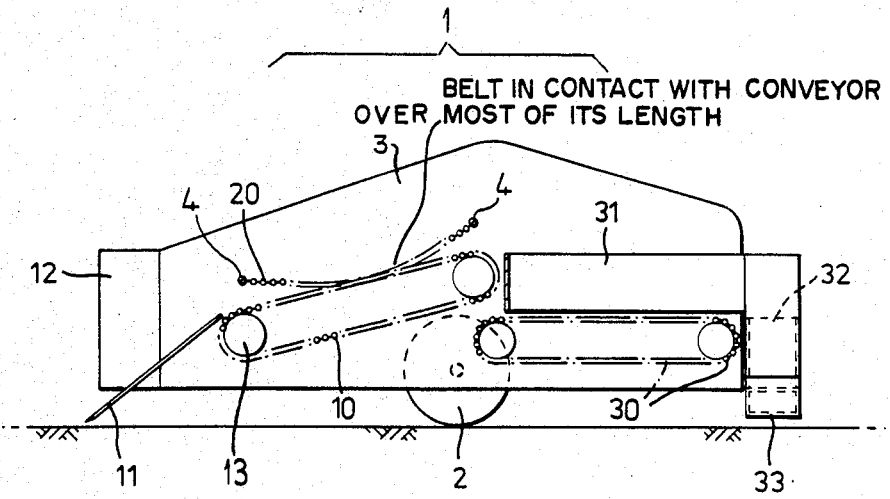
FIG. 1 is a diagrammatic vertical section through the device.
Figure 2:
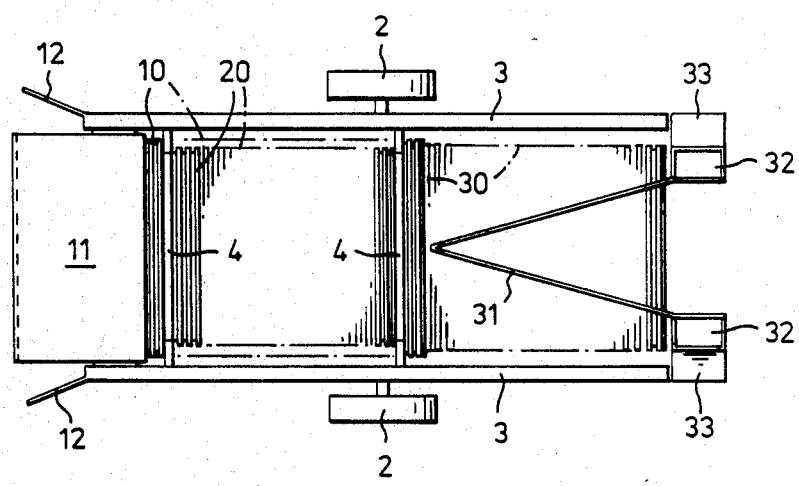
FIG. 2 is a diagrammatic plan view.

The device comprises a frame 1 which is to be drawn across the land by a tractor or other motive power means (not shown). The frame 1 can be suspended entirely from the rear hydraulic arms of the tractor; or part or all of the weight of the device can be carried by one or more pairs of land wheels 2, eg. at the rear of the device as shown. If desired, the device can incorporate a motor or other power means to render it self-propelled. However, it is particularly preferred that the device be drawn by a tractor via the hydraulic arms thereof and that means, e.g a winch or other lifting means, be provided for lifting the rear end of the device clear of the ground to permit the tractor to turn at the headland of a field.

The frame 1 conveniently takes the form of two spaced apart but generally parallel side members 3 linked by suitable spacer bars 4 to form a substantially rigid elongated structure having a substantially void central passageway along its length.

Within this central passageway is the first conveying means 10 which receives material lifted from the soil by a lifting means located transversely of the frame 1. The lifting means conveniently takes the form of a simple longitudinally inclined transverse blade 11 mounted at the front of frame 1. The blade slices the top layer, eg. 5–25 cms deep, from the soil as the device traverses the land. The lifting means can take other forms, eg. one or more shaped share blades. Preferably, the angle of inclination and depth of penetration of the blade 11 are made adjustable, eg. by suitable screw adjusting means. If desired, the leading edge of the blade can be serrated to aid its passage through the soil. Also, the blade can be oscillated, reciprocated or vibrated to aid its passage.

The blade 11 lifts the top layer of soil, stones and clods from the land and deposits it, either directly or via an intermediate transfer member, eg. a static feed plate, on to conveyor 10. Preferably, a wing 12 is provided at the front of each member 3 to reduce the amount of soil which spills sideways off the blade 11 as it passes to conveyor 10. These wings can be splayed as shown, or can be simple extensions of the frames 3.

Conveyor 10 can take a number of forms and serves to carry the soil, stones and clods under the upper surface 20. By virtue of the apertures therein, conveyor 10 permits the finer fractions of the material on the conveyor to be returned to the land. The apertures can take any suitable form, shape or size, eg. they can be circular, squared or triangular holes cut through a sheet of material forming the conveyor. The apertures in the surface of conveyor 10 are smaller than the smallest stone which a potato harvester would collect and retain during subsequent harvesting. Typically, they will have a largest dimension of from 1 to 6 cms.

A particularly preferred form of the conveyor 10 is a series of transverse bars or rods carried by one or more belts so as to form a continuous slatted belt around one or more pairs of driving rollers 13. Typically, the bars will have a diameter of from 0.5 to 1.5 cms and the spacing between successive bars will be from 1.0 to 6.0 cms. The bars can be made from any suitable material, eg. stainless or mild steel. Preferably, the bars are attached to an endless rubber or similar belt at each end of the bars, optionally with a third belt at substantially the centre of the bars, to form the closed loop of the conveyor 10. With the device of the invention, the stones and clods are retained on the conveyor 10 and are not allowed to slip between the bars as is desired with a conventional harvester belt.

In order to aid the crumbling of clods on the conveyor 10, it is preferred to incline the conveyor upwards in the direction of movement of the load carrying upper surface of the conveyor. This inclination is typically at from 15° to 45° to the horizontal and serves to retain the particles of material on the conveyor as a rolling bed of particles, thus increasing the crumbling and abrasion of the particles before they reach the discharge end of the conveyor.

The drive rollers 13 for conveyor 10 and the drive for other moving parts in the device can be obtained from the power take off point of the tractor by any suitable means. Alternatively, the drive can be provided from ground wheels driven as the device is passed over the land.

As indicated above, the conveyor 10 carries the soil, stones and clods under the upper surface 20. This surface serves as a backing against which the soil and clods are abraded and crumbled as they are carried by conveyor 10. By being flexible, the surface 20 can deform to accommodate stones and other material which is not broken down on conveyor 10. Surface 20 is conveniently provided by a length of belting formed from transverse bars or rods carried by peripheral belts or chains as described above for conveyor 10. If desired, the belting can be provided with transverse ribs, projections or an abrasive surface so as to aid break down of clods. The surface 20 is conveniently formed by suspending a length of belt by its ends over conveyor 10 as shown. The belt is preferably suspended so that it lies in contact with conveyor 10 over most, eg. 60% to 90% of its length. If desired, the suspension means can incorporate springs or other means for absorbing shocks or stresses during operation of the device.

As indicated above, the surface 20 can be flexible. This permits the surface to move away from conveyor 10 to permit the passage of stones or other material which resists breaking down. However, surface 20 should bear against material on conveyor 10 with sufficient force to break down clods on the conveyor. This can be achieved by tensioning the belt forming the surface, by applying a load, eg. by springs or other means, to the other side of the belt, or most preferably by forming surface 20 from a comparatively heavy material, eg. one having a weight of from 20 to 100 Kgs per square meter. Alternatively, weights such as sand or pebble-filled sacks can be fixed to the belt to achieve a variable loading on the belt 20 according to the requirements of different conditions.

Whilst the device has been described above in terms of the surface 20 flexing away from the conveyor 10, it is within the scope of the present invention for the reverse to occur or for both the conveyor and the surface to flex.

The material from conveyor 10 can be discharged directly on to the ground to either side of the device so that the amount of stones or unbroken clods returned into the area where the seed potatoes are to be sown is minimised. This can be achieved by inclining conveyor 10 upwardly, as described earlier, so that material discharged from the conveyor falls onto one or more chutes directed laterally of the device. Alternatively, the material can be deposited onto a second, generally horizontal, conveyor 30 which is conveniently of similar construction to the conveyor 10, preferably it is made from transverse rods linked by peripheral belts or chains. The material carried by conveyor 30 is displaced from the conveyor using a wide range of means. For example, the material can be positively displaced from the conveyor by a rotating arm or brush which sweeps the material off the conveyor. However, it is preferred to use a substantially static displacement member which can displace the material to either or both sides of the device. Suitable members include one or more deflector or scraper blades co-operating with the conveyor. If desired, the blades can take the form of a 'V' shaped share blade as shown. In order to reduce the amount of material escaping under the blade, it can be provided with a rubber or other flexible lower edge which bears against the conveyor 30. If desired, conveyor 30 can be provided with one or more support rollers or plates to support it as it passes under the blade. Typically, the V of such a blade will include an angle of between 30° and 70° at its apex and the V can be hinged at its apex so that the angle can be varied to suit different conditions.

The material displaced from the conveyor 30 can fall directly onto the land. However, it is preferred to feed it into some means for directing the discharge into the desired position on the land. Thus, for example, the rearward ends of member 31 can carry chutes 32 into which the material from conveyor 30 falls or is guided by member 31. Preferably, each chute 32 terminates in a shoe 33 which is directed outwardly from the device to deposit the material from chutes 32 onto the land.

The device of the invention can be made from any suitable material as a specific machine for breaking clods. However, it can also be made by simple modifications of a conventional potato harvesting machine by the addition of surface 20 and blades 31 and minor modification to conveyors 10 and 30. The invention thus enables an existing machine to be used to serve two functions with comparatively minor cost and effort, and provides a light weight machine.

I claim:

1. A device for separating clods and stones from the soil, said device comprising:

a frame adapted to be drawn or carried across the land;

a first conveyor means on said frame;

at least one means carried by said frame for raising the surface layer of soil material from the land and passing it to said first conveyor means;

said first conveyor means having apertures therethrough to permit material on said first conveyor means to pass therethrough and to be returned to the land;

a substantially static surface means disposed above said first conveyor means for bearing against material on said first conveyor means so as to crush and abrade material on said first conveyor means and thereby reduce its particle size to permit it to pass through said apertures in said first conveyor means;

said surface means extending over and being in contact with at least 60% of the length of said first conveyor means;

said first conveyor means being adapted to discharge particles of material retained thereon to a means for returning those particles to the land on at least one side of the device; and said surface means and said first conveyor means being adapted to move apart from one another to permit the passage therebetween of resistant material.

2. A device as claimed in claim 1, wherein said surface means exerts a load of at least 20 Kgs per square meter on said first conveyor means.

3. A device as claimed in claim 1, wherein said surface means disposed above said first conveyor means comprises an elongated flexible member suspended at each end thereof above said first conveyor means.

4. A device as claimed in claim 1, wherein said surface means contacts said first conveyor means over from 75 to 90% of the material carrying surface thereof.

5. A device as claimed in claim 1, wherein said first conveyor means discharges particles retained thereon onto a second conveyor means which is provided with means for displacing the particles therefrom to return the particles to the land on at least one side of the device.

6. A device as claimed in claim 5, wherein said displacing means comprises at least one blade member adapted to co-operate with said second conveyor means to guide particles off said second conveyor means.

7. A device as claimed in claim 1, wherein said first conveyor means comprises a longitudinal series of transverse rods linked by peripheral chains and passed around at least one drive member to form an endless belt-type conveyor.

8. A device as claimed in claim 1, wherein said surface means disposed above said first conveyor means comprises a longitudinal series of transverse rods linked by peripheral chains to form a belt-like member which is suspended over said first conveyor means.

* * * * *